US012572158B2

(12) United States Patent
Tanaka

(10) Patent No.: US 12,572,158 B2
(45) Date of Patent: Mar. 10, 2026

(54) RECEPTION DEVICE

(71) Applicant: Futaba Corporation, Chiba-ken (JP)

(72) Inventor: Masahiro Tanaka, Chiba-Ken (JP)

(73) Assignee: Futaba Corporation, Chiba-ken (JP)

( * ) Notice: Subject to any disclaimer, the term of this patent is extended or adjusted under 35 U.S.C. 154(b) by 111 days.

(21) Appl. No.: 18/406,664

(22) Filed: Jan. 8, 2024

(65) Prior Publication Data

US 2024/0370039 A1     Nov. 7, 2024

(30) Foreign Application Priority Data

Jan. 30, 2023     (JP) .................................. 2023-012065

(51) Int. Cl.
G05D 1/85 (2024.01)
G08G 5/22 (2025.01)
G08G 5/26 (2025.01)

(52) U.S. Cl.
CPC .............. G05D 1/854 (2024.01); G08G 5/22 (2025.01); G08G 5/26 (2025.01)

(58) Field of Classification Search
None
See application file for complete search history.

(56) References Cited

U.S. PATENT DOCUMENTS

| | | | | |
|---|---|---|---|---|
| 2012/0319540 A1* | 12/2012 | Tsuchiya | ................ | G08C 17/02 |
| | | | | 310/68 B |
| 2013/0138266 A1* | 5/2013 | Koike | .................... | A63H 30/04 |
| | | | | 701/2 |

| | | | | |
|---|---|---|---|---|
| 2013/0253773 A1* | 9/2013 | Itamoto | ................ | B62D 5/0484 |
| | | | | 701/43 |
| 2017/0315546 A1 | 11/2017 | Tanaka | | |
| 2019/0220004 A1* | 7/2019 | Von Novak, III | ..... | B63H 21/21 |
| 2019/0233087 A1* | 8/2019 | Avritch | ................ | B64C 13/503 |
| 2022/0050463 A1* | 2/2022 | Zaydel | .................... | G05D 1/43 |

FOREIGN PATENT DOCUMENTS

| | | |
|---|---|---|
| TW | I636674 B | 9/2018 |

OTHER PUBLICATIONS

Search Report dated Nov. 21, 2024 in corresponding Taiwan Appl. No. 113101220.

* cited by examiner

*Primary Examiner* — Jelani A Smith
*Assistant Examiner* — Davin Seol
(74) *Attorney, Agent, or Firm* — BACON&THOMAS,PLLC

(57) ABSTRACT

Provided is a reception device comprising: a reception part configured to receive the control signal from a transmission device; and a controller configured to performs a process of outputting a motor driving instruction value corresponding to the control signal received by the reception part as a motor driving instruction value for controlling a driving amount of a motor, wherein the controller performs: a hold process for holding and outputting a value corresponding to the control signal during a reception period as the motor driving instruction value when the control signal is not receivable; and a failsafe gradual change process for gradually changing the motor driving instruction value from the value during the hold process toward a failsafe value determined for failsafe when a period of the hold process reaches a certain period.

15 Claims, 8 Drawing Sheets

*FIG. 1*

RECEPTION DEVICE

CROSS-REFERENCE TO RELATED APPLICATIONS

This application claims priority to Japanese Patent Application No. 2023-012065 filed on Jan. 30, 2023, the entire contents of which are incorporated herein by reference.

TECHNICAL FIELD

The present disclosure relates to a reception device mounted on an operated object that is remotely controlled based on a control signal transmitted from a transmission device; and, more particularly, to a technique of a process for dealing with a case where a control signal cannot be received.

BACKGROUND

For example, in a radio control system that remotely controls an operated object such as a model airplane, a drone, a model vehicle, or the like, when a receiver mounted on the operated object cannot receive control signals from a transmitter, a motor driving instruction value for controlling a driving amount of a motor mounted on the operated object is held at a value during a reception period. If a reception failure state continues, a failsafe process for outputting a predetermined failsafe value (e.g., a low output value such as 0) as the motor driving instruction value is performed.

By performing the failsafe process, it is possible to avoid a dangerous situation in which the operation of the operated object is continued in a high propulsive force state, e.g., in a maximum propulsive force state, or the like.

The related prior arts may include the following Japanese Laid-open Patent Publication No. H09-186615 and Japanese Laid-open Patent Publication No. 2000-024333.

Japanese Laid-open Patent Publication No. H09-186615 discloses a technique that outputs previous operation command data when radio wave reception fails or abnormal radio waves are received in a radio control system in which an unmanned aircraft operates in response to operation command data via radio waves.

Further, Japanese Laid-open Patent Publication No. 2000-024333 discloses a technique for gradually changing (delaying) a value instead of suddenly changing a value in the case of changing a motor driving instruction value to a value corresponding to a switched mode in response to switching between a flight mode and a hovering mode in a radio control system for a model helicopter, in which different motor driving instruction values are outputted in the flight mode and the hovering mode for the same amount of stick operation.

SUMMARY

Here, the above-described failsafe process is useful for improving safety. However, due to the activation of the failsafe process, the motor driving instruction value may change suddenly and, thus, the posture of the operated object may change suddenly.

When the motor driving instruction value changes suddenly, the motor may be damaged due to the influence of a counter electromotive force.

The present disclosure has been made in view of the above circumstances, and has an object of improving safety by performing a failsafe process and improving safety by preventing a sudden change in the posture of the control object and the damage to the motor due to the activation of the failsafe process.

In accordance with an aspect of the present disclosure, there is provided a reception device mounted on an operated object that is remotely controlled based on a control signal, comprising: a reception part configured to receive the control signal from a transmission device; and a controller configured to performs a process of outputting a motor driving instruction value corresponding to the control signal received by the reception part as a motor driving instruction value for controlling a driving amount of a motor, wherein the controller performs: a hold process for holding and outputting a value corresponding to the control signal during a reception period as the motor driving instruction value when the control signal is not receivable; and a failsafe gradual change process for gradually changing the motor driving instruction value from the value during the hold process toward a failsafe value determined for failsafe when a period of the hold process reaches a certain period.

Due to the failsafe gradual change process, it is possible to prevent the motor driving instruction value from changing suddenly by the activation of the failsafe process after the hold process, and also possible to prevent the posture of the operated object from being changed suddenly or the motor from being damaged by the activation of the failsafe process.

BRIEF DESCRIPTION OF THE DRAWINGS

FIG. 1 is a block diagram showing a configuration example of a radio control system according to an embodiment of the present disclosure.

DETAILED DESCRIPTION

Figure 2:
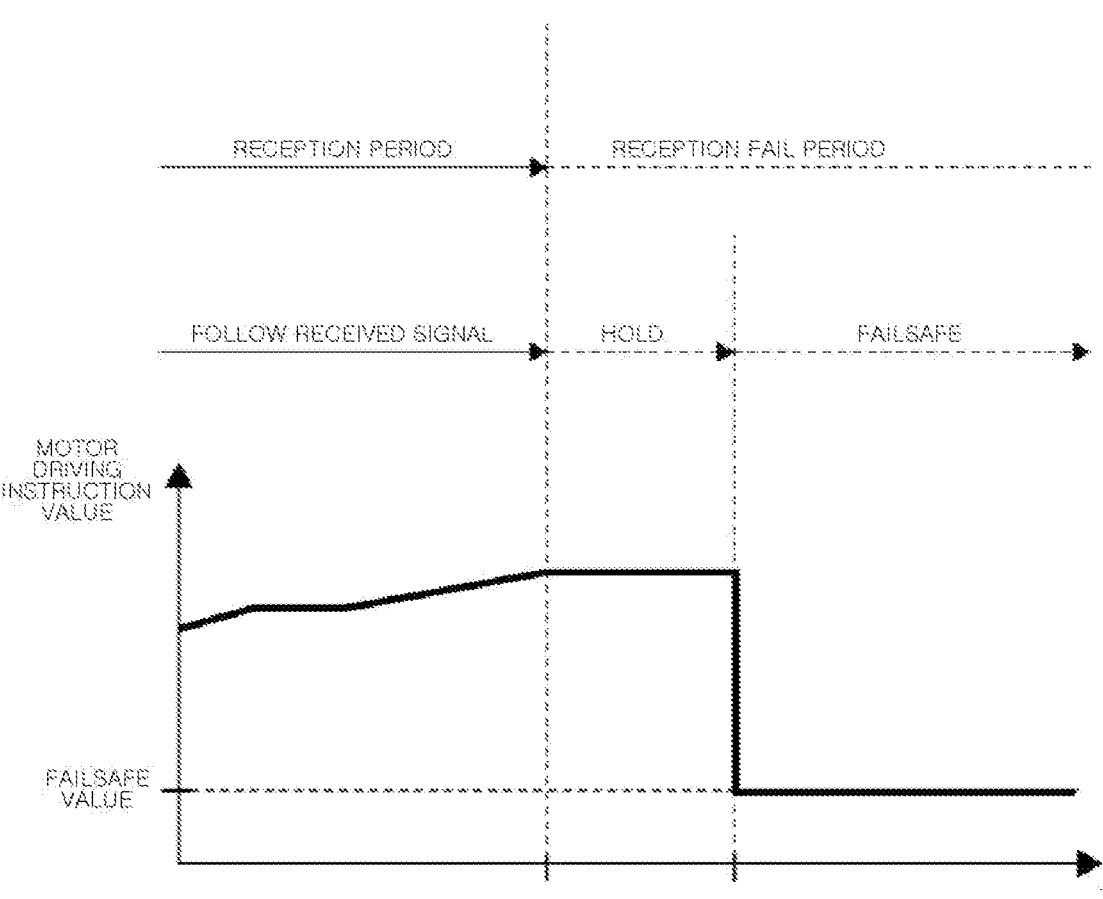
FIG. 2 is an explanatory diagram of a conventional failsafe process.

Hereinafter, embodiments of the present disclosure will be described in the following order.
  <1. System configuration>
  <2. Motor driving instruction value control method according to embodiment>
  <3. Process procedure>
  <4. Modification>
  <5. Summary of embodiment>

1. SYSTEM CONFIGURATION

Figure 1:
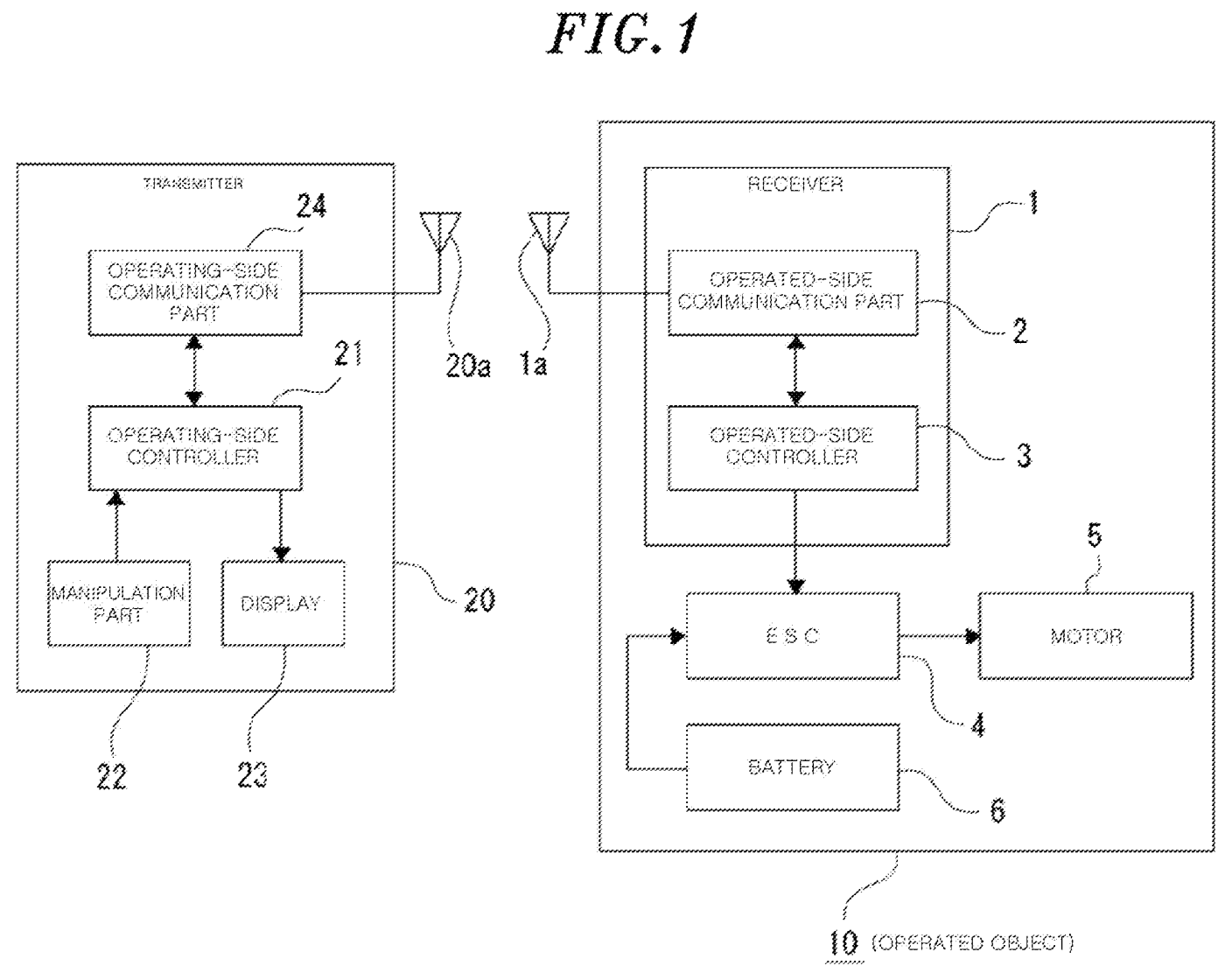

FIG. 1 is a block diagram showing an example of a configuration of a radio control system including a receiver 1 as an embodiment of a reception device of the present disclosure.

As illustrated, the radio control system includes a transmitter 20 and an operated object 10. The transmitter 20 has a function of receiving an operation for manipulation by a user as an operator, and transmitting a control signal in response to the received operation.

The operated object 10 is an object that is controlled based on the control signal transmitted by the transmitter 20. The operated object may be, e.g., a flying object such as a model airplane, a model helicopter, or a drone, or a model vehicle, various robots, or the like.

In this example, it is assumed that the operated object 10 is a flying object, specifically a model airplane.

The transmitter 20 includes an operating-side controller 21, a manipulation part 22, a display 23, and an operating-side communication part 24.

The manipulation part 22 includes various manipulation elements for allowing user's various manipulation inputs to the transmitter 20, such as a stick-type manipulation element for a manipulation operation of the operated object 10, specifically, for instructing a propulsive force of the operated object or braking the operated object, and instructing the direction or amount of rotation, or a button, a touch panel, or the like for various manipulation inputs related to the manipulation of the operated object, other than the manipulation operation.

The display 23 includes a display device such as a liquid crystal display (LCD) or an organic electro luminescence (EL) display, and displays various information to the user.

When the manipulation part 22 has a touch panel, the touch panel may be formed on the display screen of the display 23, and may be configured to detect touch manipulation on various buttons, check boxes, or the like displayed on the display screen.

The operating-side controller 21 includes, e.g., a microcomputer provided with a central processing unit (CPU), a read only memory (ROM), a random access memory (RAM), or the like, and performs overall control of the transmitter 20 by executing a process corresponding to a program stored in a memory such as the ROM or the like by the CPU.

For example, the operating-side controller 21 performs a process for generating a control signal based on the manipulation of the above-described manipulation element in the manipulation part 22.

Further, the operating-side controller 21 performs a corresponding setting process based on the manipulation on various setting manipulation elements in the manipulation part 22.

Further, the operating-side controller 21 displays various information on the display 23 based on the manipulation on a predetermined manipulation element in the manipulation part 22. For example, the display part 23 causes the display part 23 to display a setting menu screen related to manipulation, or display a setting screen for an item selected on the setting menu screen.

Further, the display 23 displays, on the setting screen, information such as a user's instruction value by manipulating the manipulation part 22, or performs a setting process corresponding to the manipulation based on the setting instruction manipulation.

Here, the setting includes setting for the receiver 1 as well as setting for the transmitter 20. The operating-side controller 21 causes the operating-side communication part 24 to transmit the setting information on the receiver 1 to the receiver 1 side through an antenna 20a.

Further, the operating-side controller 21 causes the operating-side communication part 24 to transmit the control signal generated based on the above-described manipulation operation to the receiver 1 side through the antenna 20a.

The operating-side communication part 24 is a communication device configured to perform wireless communication using a predetermined frequency band, such as 2.4 GHz band or the like, with an external device through the antenna 20a. In this example, the operating-side communication part 24 is configured to transmit and receive information (data) to and from the external device. However, in the present disclosure, the operating-side communication part 24 may have at least a function of transmitting information to the external device.

The operated object 10 is equipped with the receiver 1 as an embodiment, and also equipped with an electronic speed controller (ESC) 4, a motor 5, and a battery 6.

The receiver 1 includes an operated-side communication part 2 and an operated-side controller 3.

The operated-side communication part 2 is a communication device configured to perform wireless communication using a predetermined frequency band such as 2.4 GHz band or the like (a frequency band that can be handled by the above-described operating-side communication part 24) with an external device through the antenna 1a.

In this example, the operated-side communication part 2 is configured to transmit and receive information (data) to and from an external device, similarly to the above-described operating-side communication part 24. However, in the present disclosure, the operated-side communication part 2 may have at least a function of receiving transmission information from an external device. Accordingly, the operated-side communication part 2 (the receiver 1) can receive the control signal or the setting information transmitted from the transmitter 20.

The operated-side controller 3 includes a microcomputer provided with, e.g., a CPU, a ROM, a RAM, or the like, and performs overall control of the receiver 1 by executing a process corresponding to the program stored in the memory such as the ROM or the like by the CPU.

The operated-side controller 3 outputs a motor driving instruction value corresponding to the control signal received by the operated-side communication part 2 as the motor driving instruction value for controlling the driving amount of the motor 5.

Here, in this example, the motor 5 serves as a propulsive power source of the operated object 10.

When an engine serves as a propulsive power source, a servo motor for performing throttle control of the engine is mounted on the operated object 10. However, in the present disclosure, the motor 5 itself is mounted as the propulsive power source of the operated object.

In this case, the motor driving instruction value of the receiver 1 is not directly outputted to the motor 5, but is outputted to an ESC 4 that is also referred to as a speed controller. The ESC 4 generates a driving signal for the motor 5 based on the inputted motor driving instruction value and the power supplied from the battery 6, and controls the driving of the motor 5 using the driving signal.

Although detailed illustration is omitted, an operating power is supplied to the receiver 1 from the battery 6 via, e.g., the ESC 4.

Further, in the operated object 10, actually, in order to change the direction of movement such as rotation or to change the posture, a separate actuator (e.g., a servo motor for driving a mechanism such as a rudder, an aileron, or the like in a model airplane, or a servo motor for driving a steering mechanism in a model vehicle) other than the motor 5 is installed. Since, however, the installation of the actuator or the processing contents of the driving control system in response to the control signal are well known, the description thereof will be omitted.

2. MOTOR DRIVING INSTRUCTION VALUE CONTROL METHOD ACCORDING TO EMBODIMENT

FIG. 2 is an explanatory diagram of a conventional failsafe process.

As described above, in the radio control system, when the receiver mounted on the operated object cannot receive the control signal from the transmitter, the motor driving instruction value is held at a value during the reception period. If the reception failure state continues, the failsafe process in which a predetermined failsafe value (e.g., a low output value such as 0) is outputted as the motor driving instruction value may be performed.

As shown in FIG. 2, in the conventional failsafe process, the motor driving instruction value is switched from the value during the hold process to the failsafe value in response to the completion of the hold process for a certain period of time. Specifically, the failsafe value is outputted as the motor driving instruction value at next processing timing of the processing timing at which the hold process is completed.

Therefore, in a conventional case, when the failsafe process was activated, the motor driving instruction value changed suddenly, which may cause a sudden change in the posture (disturbance of posture) of the operated object, and the motor 5 may be damaged by the influence of counter electromotive force.

In particular, in a configuration in which the motor 5 is used as a propulsive power source of the operated object 10, similarly to the operated object 10 of this example, the motor 5 has a relatively high output, so that the posture of the control object 10 is likely to become unstable as the motor driving instruction value suddenly changes to the failsafe value, and the motor is more likely to be damaged because the amount of counter electromotive force tends to increase.

Further, when the motor 5 is used as the propulsive power source of the operated object 10, the system may be configured such that the decrease in the motor driving instruction value acts as a deceleration (braking) instruction. In this case, the disturbance of the posture of the control object 10 is more likely to occur due to the sudden change of the motor driving instruction value to the failsafe value.

Figure 3:
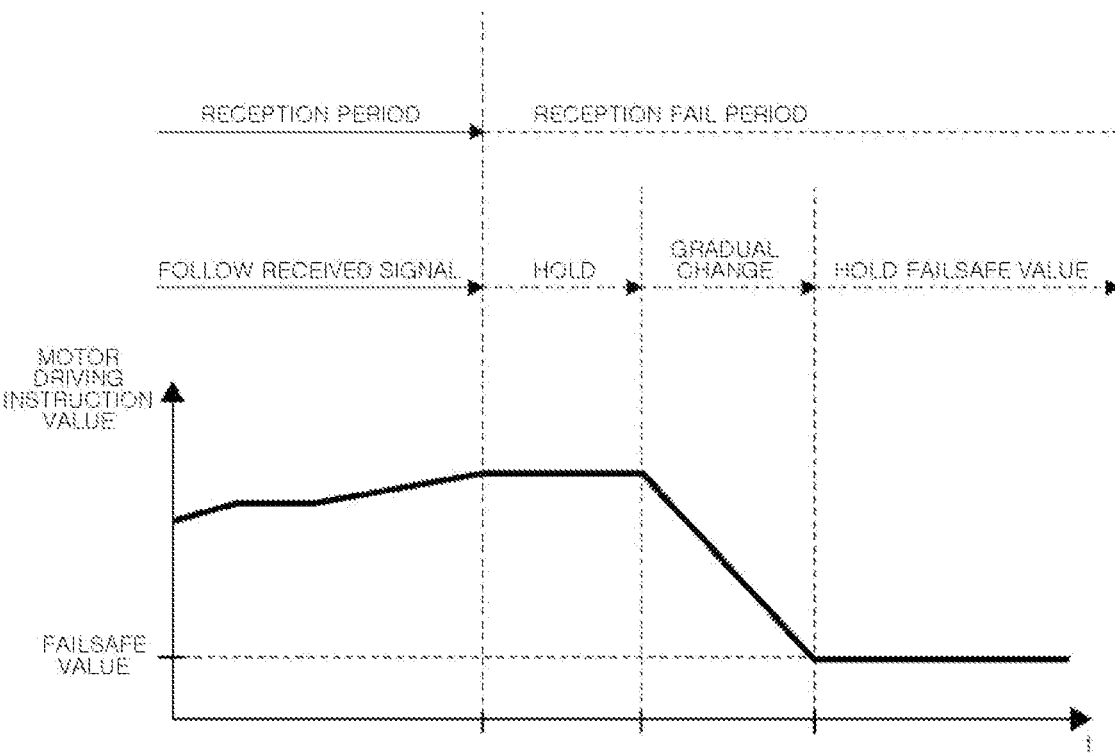
FIG. 3 is an explanatory diagram of a failsafe process according to an embodiment.

Therefore, in the present embodiment, as shown in FIG. 3, there is employed a method in which the motor driving instruction value is gradually changed toward the failsafe value upon completion of the hold process for a certain period of time.

Figure 4:
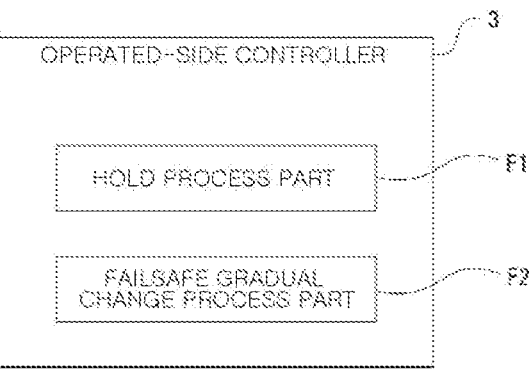
FIG. 4 is a functional block diagram for explaining the functions of a reception device according to an embodiment.

FIG. 4 is a functional block diagram for explaining the function of the operated-side controller 3 in the receiver 1 according to an embodiment.

As illustrated, the operated-side controller 3 has functions of a hold process part F1 and a failsafe gradual change process part F2.

When the control signal cannot be received, the hold process part F1 performs a hold process for holding and outputting a value corresponding to the control signal during the reception period as the motor driving instruction value.

In this example, whether or not the control signal cannot be received is determined by determining whether or not the data for one transmission unit can be received from the transmitter 20 during the period in which data for one transmission unit (e.g., one packet) can be received.

Whether or not the reception has failed may be determined by determining whether or not the consecutive number of times in which the reception of the data for one transmission unit cannot be completed exceeds a predetermined number of times (i.e., whether or not the period in which the data cannot be received exceeds a predetermined period).

When it is determined that the control signal cannot be received, the hold process part F1 performs a process such that the motor driving instruction value corresponding to the control signal (i.e., the lastly received control signal) received at the previous reception timing, i.e., the previous receivable period of the period in which data for one transmission unit whose reception has failed can be received, is hold-outputted, as the motor driving instruction value, for a certain period.

In the hold process, the "certain period" for holding the motor driving instruction value can be arbitrarily determined. However, it is preferable to minimize the "certain period" in consideration of safety.

Further, the motor driving instruction value held in the hold process is not limited to the motor driving instruction value corresponding to the lastly received control signal. For example, the motor driving instruction value may be the motor driving instruction value corresponding to the control signal received at the reception timing immediately before the reception timing of the last control signal, or may be the average of a plurality of motor driving instruction values including the motor driving instruction value corresponding to the lastly received control signal and the motor driving instruction value corresponding to the control signal received at the previous reception timing.

The motor driving instruction value held in the hold process may be at least the motor driving instruction value corresponding to the control signal during the reception period.

The failsafe gradual change process part F2 performs a failsafe gradual change process in which the motor driving instruction value changes gradually from the value in the hold process to the failsafe value determined for failsafe (see "gradual change" part in FIG. 3) when the hold process period during which the motor driving instruction value is held and output by the hold process part F1 reaches a certain period.

In the above failsafe gradual change process, the process of gradually changing the motor driving instruction value may also be referred to as "delay process" because the timing at which the motor driving instruction value reaches a target value is delayed.

Further, in the process of gradually changing the motor driving instruction value may also be referred to as "delay process" because a tracking speed of the motor 5 is delayed compared to a reference tracking speed indicating the tracking speed of the motor 5 in the case where the motor driving instruction value is suddenly changed to the target value.

Here, in the radio control system of this example, it is possible to variably set four items including whether the failsafe process is activated or deactivated (i.e., ON/OFF of the failsafe process), whether the failsafe gradual change process is activated or deactivated (i.e., ON/OFF of the failsafe gradual change process), the gradual change period of the motor driving instruction value in the failsafe gradual change process, and the failsafe value.

The ON/OFF of the failsafe process, which is a process for dealing with a case where the control signal cannot be received, corresponds to switching between the case of performing only a hold process and the case of changing the motor driving instruction value to the failsafe value after the holding process. In response to an instruction of setting the failsafe process ON and setting the failsafe gradual change process ON, the failsafe gradual change process and the failsafe hold process (the process of holding the failsafe value) to be described later are performed after the hold process. On the other hand, in response to an instruction of setting the failsafe process ON and setting the failsafe gradual change process OFF, the same failsafe process as the conventional failsafe process is performed after the hold process. In other words, the process of changing the motor driving instruction value to the failsafe value without the failsafe gradual change process is performed (see FIG. 2).

The operated-side controller 3 of this example can variably set the above four items based on user's manipulation input.

Specifically, in this example, the above four items can be set by user's manipulation on the transmitter 20. In this case, in the transmitter 20, the instruction operation for the above four items can be performed on the setting screen displayed on the display part 23, for example. The operating-side controller 21 in the transmitter 20 transmits the information (instruction information) indicating the ON/OFF of the failsafe process, the ON/OFF of the failsafe gradual change process, the gradual change period, and the failsafe value, which is instructed by a user on the setting screen, to the receiver 1 side using the operating-side communication part 24. The operated-side controller 3 in the receiver 1 performs a process of setting the ON/OFF of the failsafe process, the ON/OFF of the failsafe gradual change process, the gradual change period, and the failsafe value based on the instruction information transmitted from the transmitter 20 side and received by the operated-side communication part 2.

In this case, in this example, the operating-side controller 21 performs the process of repeatedly transmitting the instruction information on the four items to the receiver 1 at a predetermined cycle, and the operated-side controller 3 performs the process of setting the ON/OFF of the failsafe process, the ON/OFF of the failsafe gradual change process, the gradual change period, and the failsafe value based on the instruction information whenever the transmitted instruction information is received.

With the above configuration, a user as an operator can change the ON/OFF of the failsafe process, the ON/OFF of the failsafe gradual change process, the gradual change period, and the failsafe value while controlling the operated object 10.

In the above example, the instruction information on all four items are repeatedly transmitted at a predetermined cycle, and the operated-side controller 3 performs setting whenever the instruction information on all four items is received. However, it is also possible to repetitively transmit the instruction information on some of the four items, and perform setting of the corresponding items.

Although the example in which the instruction information is transmitted from the transmitter 20 to the receiver 1 side by wireless communication has been described, the instruction information on at least some of the four items may be transmitted by wired communication by connecting the transmitter 20 and the receiver 1 through a predetermined cable.

Further, the instruction operation of at least some of the four items may be received by an external device (an external device of the receiver 1) other than the transmitter 20, such as an information processor, e.g., a personal computer, a smart phone, a tablet terminal, or a setting tool, and the instruction information may be transmitted from the external device to the receiver 1 by wired communication.

Alternatively, the instruction operation of at least some of the four items may be received by the receiver 1 when the manipulation input can be performed through the receiver 1.

Although the example in which the four items can be variably set based on a user's instruction has been described, at least some of the four items may be set without a user's instruction. For example, the gradual change period may be variably set depending on the magnitude of the motor driving instruction value. Specifically, in this case, the operated-side controller 3 variably sets the gradual change period such that the gradual change period becomes shorter as the motor driving instruction value becomes smaller (i.e., the difference between the value during the hold process and the failsafe value becomes smaller).

Alternatively, whether or not the motor driving instruction value is smaller than or equal to a predetermined value is determined. When the motor driving instruction value is not smaller than or equal to the predetermined value, the setting in which the failsafe process is ON and the failsafe gradual change process is ON is performed. When the motor driving instruction value is smaller than or equal to the predetermined value, the setting in which the failsafe process is OFF and the failsafe gradual change process is OFF or the setting in which the failsafe process is ON and the failsafe gradual change process is OFF may be performed. In other words, when the motor driving instruction value is not smaller than or equal to the predetermined value and it is estimated that the difference with the failsafe value upon completion of the hold process is large, the setting in which the motor driving instruction value is changed to the failsafe values through the failsafe gradual change process is performed. When the driving instruction value is smaller than or equal to the predetermined value and it is estimated that the difference with the failsafe value upon completion of the hold process is small, the setting in which the failsafe process including the failsafe gradual change process is not performed or the setting in which the motor driving instruction value is changed to the failsafe value without the failsafe gradual change process is performed.

Here, the operated-side controller 3 performs the failsafe hold process. The failsafe hold process is a process of holding the motor driving instruction value at the failsafe value after the motor driving instruction value is changed to the failsafe value by the above-described failsafe gradual change process (see "failsafe value hold" part in FIG. 3).

By performing the failsafe hold process, it is possible to stand by the restart of reception in a state where the motor driving instruction value is suppressed at the failsafe value.

Therefore, it is possible to avoid the standby of the restart of reception in a state where the propulsive force of the operated object is high, and also possible to improve the safety.

The term "failsafe process" in the present embodiment includes both "failsafe gradual change process" and "failsafe hold process."

In the above, the case in which the process of gradually changing the motor driving instruction value is performed as "failsafe gradual change process" upon completion of the hold process has been described. However, the operated-side controller 3 in this example may also perform the process of gradually changing the motor driving instruction value when the reception of the control signal is restarted.

Specifically, the gradual change process in this case is a process of gradually changing the motor driving instruction value toward "received value" that is the motor driving instruction value corresponding to the control signal after the restart of reception. In other words, the gradual change process is performed when the motor driving instruction value is returned to the received value.

Here, in this example, whether or not the reception is restarted is performed by determining whether or not the reception of the data for one transmission unit has been completed within the above-described period in which the data for one transmission unit can be received. Further, in this example, the "received value" is the motor driving instruction value corresponding to the control signal that is received when the restart of reception is determined.

Further, whether or not the reception is restarted may be determined under the condition in which the data has been consecutively received multiple times as well as the condition in which the data has been received once.

The operated-side controller 3 performs, as the gradual change process in the case of returning to the received value, each of the return process in the case of a gradual change, the return process in the case of hold, and the return process after failsafe.

Figure 5:
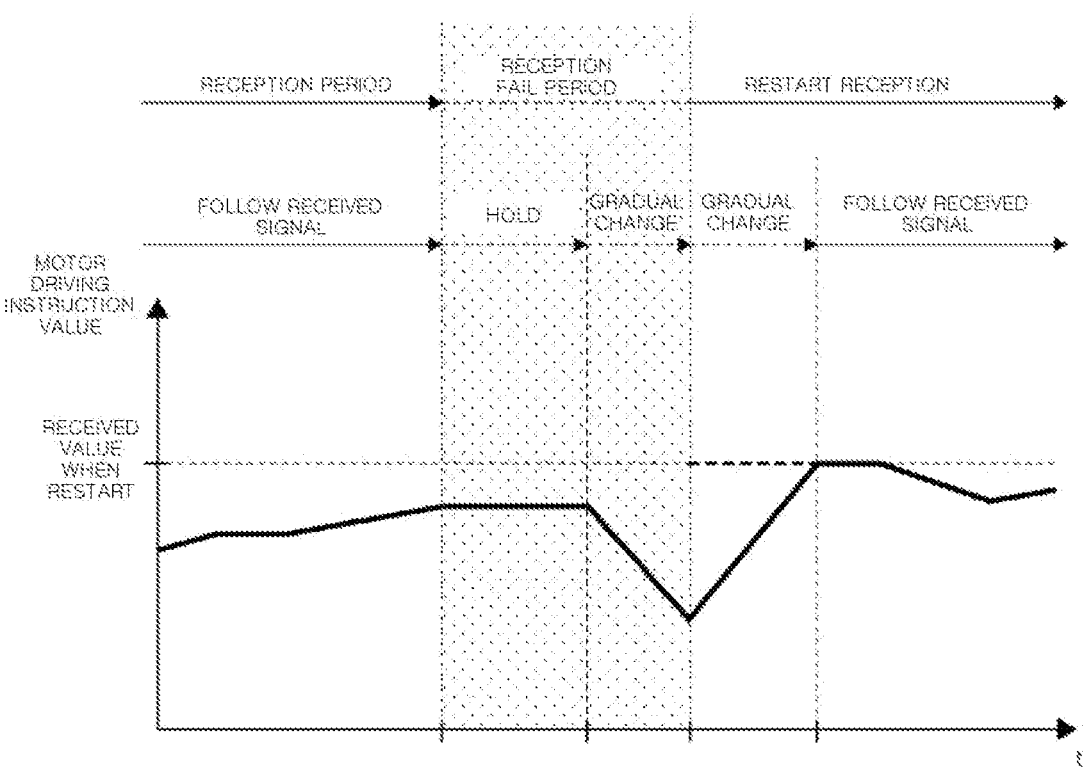
FIG. 5 is an explanatory diagram of a return process in the case of a gradual change in the embodiment.

FIG. 5 is an explanatory diagram of the return process in the case of a gradual change.

The return process in the case of a gradual change is a process in which the motor driving instruction value is gradually changed toward the received value when the reception of the control signal is restarted during the failsafe gradual change process.

As illustrated, the return process in the case of a gradual change is performed when the reception of the control signal is restarted during the failsafe gradual change process after the hold process is performed for a certain period of time due to the reception failure of the control signal.

Here, in this example, the gradual change period of the motor driving instruction value in the return process in the case of a gradual change is continued from the gradual change period set for the failsafe gradual change process.

By performing the return process in the case of a gradual change, it is possible to avoid a sudden change in the motor driving instruction value from the value during the failsafe gradual change process to the received value.

Therefore, it is possible to prevent the posture of the operated object 10 from being disturbed and prevent the motor 5 from being damaged.

Figure 6:
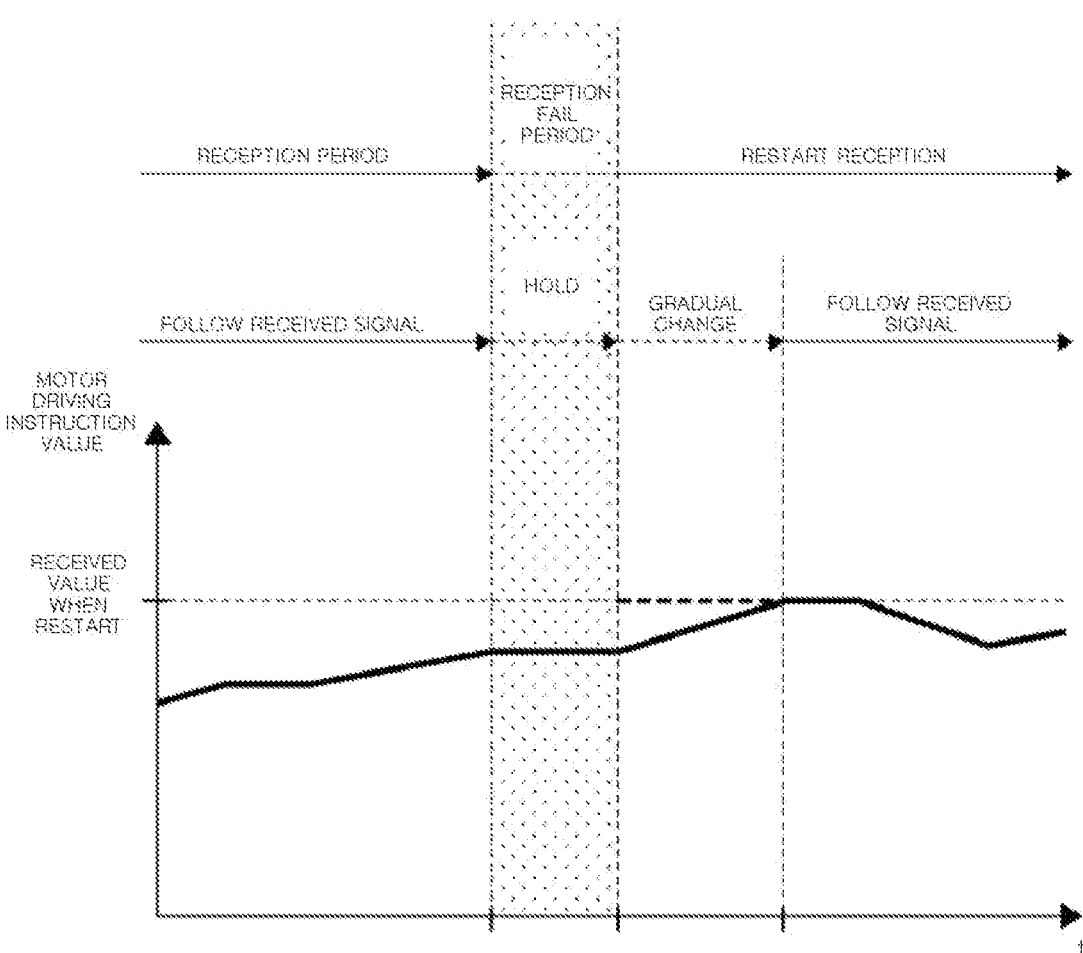
FIG. 6 is an explanatory diagram of a return process in the case of hold in the embodiment.

FIG. 6 is an explanatory diagram of the return process in the case of hold.

The return process in the case of hold is a process in which the motor driving instruction value is gradually changed toward the received value when the reception of the control signal is restated during the hold process.

The return process in the case of hold is performed when the reception of the control signal is restarted in a state where the hold period of the motor driving instruction value by the hold process has not reached a certain period.

In this example, the gradual change period of the motor driving instruction value in the return process in the case of hold is also continued from the gradual change period set for the failsafe gradual change process.

Due to the return process in the case of hold, it is possible to avoid a sudden change in the motor driving instruction value from the value during the hold process to the received value, and also possible to prevent the posture of the operated object 10 from being disturbed or the motor 5 from being damaged.

Figure 7:
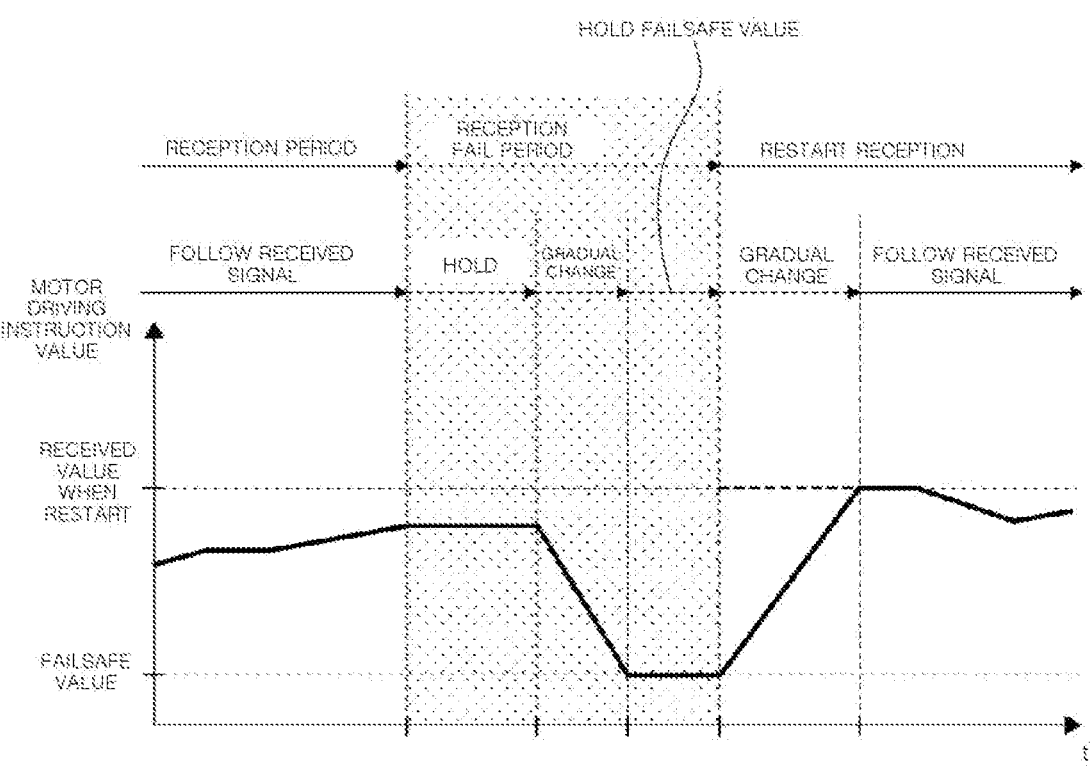
FIG. 7 is an explanatory diagram of a return process after failsafe in the embodiment.

FIG. 7 is an explanatory diagram of the return process after failsafe.

The return process after failsafe is a process in which the motor driving instruction value is gradually changed toward the received value when the reception of the control signal is restarted during the failsafe hold process.

Due to the return process after failsafe, it is possible to avoid a sudden change in the motor driving instruction value from the value during the failsafe hold process to the received value, and also possible to prevent the posture of the controller object 10 from being disturbed or the motor 5 from being damaged.

In this example, the gradual change period of the motor driving instruction value in the return process after failsafe is also continued from the gradual change period which is set for the failsafe gradual change process.

It is merely exemplary that the return process in the case of a gradual change, the return process in the case of hold, and the return process after failsafe are continued from the gradual change period set for the failsafe gradual change process. A separate gradual change period different from the gradual change period which is set for the failsafe gradual change process may be set. For example, the gradual change period for the above processes may be individually set by user's manipulation.

Here, the return process in the case of a gradual change, the return process in the case of hold, and the return process after failsafe correspond to "gradual change process in the case of restart of reception" in which the motor driving instruction value is gradually changed toward the received value when the reception of the control signal is restarted after the start of the hold process. Further, the gradual change period of the motor driving instruction value by the return process in the case of a gradual change, the return process in the case of hold, and the return process after failsafe can be expressed as "gradual change period in the case of restart of reception." The gradual change period in the case of restart of reception can also be set by the operated-side controller 3 based on the instruction from the external device of the receiver 1, such as the transmitter 20, a personal computer, or the like.

3. PROCESS PROCEDURE

Figure 8:
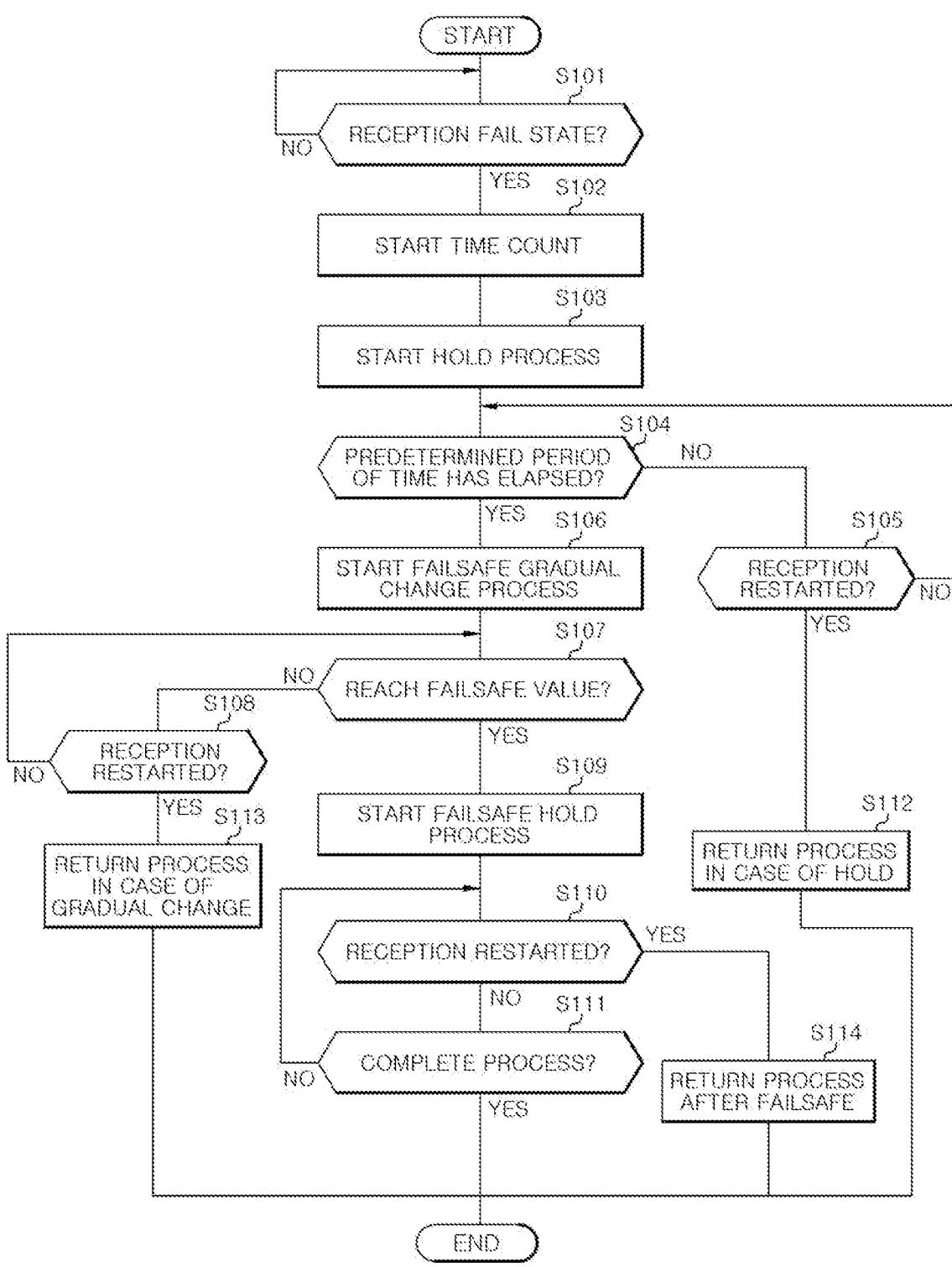
FIG. 8 is a flowchart showing an example of a specific process procedure for realizing a motor driving instruction value control method as to an embodiment.

FIG. 8 is a flowchart showing an example of a specific process procedure for realizing the motor driving instruction value control method according to the above-described embodiment.

The processes shown in FIG. 8 are performed by the CPU of the operated-side controller 3 based on the program stored in the storage device such as an ROM or the like in the operated-side controller 3. Here, it is described that the processes are performed by the operated-side controller 3.

In step S101, the operated-side controller 3 stands by until the reception fails. In other words, the operated-side controller 3 stands by until the control signal cannot be received. As described above, in this example, whether or not the reception has failed is determined by determining whether or not the reception of the data for one transmission unit cannot be completed within the period in which the data for one transmission unit (e.g., one packet) can be received.

When the reception has failed in step S101, the operated-side controller 3 starts time count in step S102, and starts a hold process in subsequent step S103. As described above, in the hold process, the operated-side controller 3 of this example holds and outputs the motor driving instruction value corresponding to the control signal received at the reception timing immediately before the reception timing at which the reception failure was determined.

In step S104 subsequent to step S103, the operated-side controller 3 determines whether or not a predetermined period of time has elapsed, i.e., whether or not the count value obtained by the time count started in step S102 has reached a predetermined value. The determination process in step S104 is a process for determining "certain period" as the hold period in the hold process.

When it is determined in step S104 that the predetermined period of time has not elapsed, the operated-side controller 3 proceeds to step S105 to determine whether or not the reception is restarted. In other words, it is determined whether or not the reception of the control signal is restarted.

When it is determined that the reception is not restarted, the operated-side controller 3 returns to step S104. Accordingly, during the hold process, any one of the elapse of "certain period" as the hold period or the restart of reception is waited.

When it is determined in step S105 that the reception is restarted, the operated-side controller 3 proceeds to step S112 to execute the above-described return process in the case of hold, and completes the series of processes shown in FIG. 8.

Further, in the return process in the case of hold, the motor driving instruction value outputted at each processing timing that is gradually changing may be obtained based on the information on the difference between the motor driving instruction value during the hold process and the received value, the processing cycle, and the set gradual change period.

When it is determined in step S104 that the predetermined period of time has elapsed, the operated-side controller 3 proceeds to step S106 and starts the failsafe gradual change process. In other words, the process of gradually changing the motor driving instruction value from the value during the hold process toward the failsafe value is performed. Accordingly, the failsafe gradual change process is started upon completion of the hold process of a certain period of time.

In failsafe gradual change process, the motor driving instruction value at each processing timing that is gradually changing is obtained based on the information on the difference between the motor driving instruction value during the hold process and the failsafe value, the processing cycle, and the set gradual change period.

In step S107 subsequent to step S106, the operated-side controller 3 determines whether or not the motor driving instruction value has reached the failsafe value. In other word, whether or not the motor driving instruction value has reached the failsafe value is determined as the failsafe gradual change process started in step S106 progresses.

When it is determined in step S107 that the motor driving instruction value has not reached the failsafe value, the operated-side controller 3 proceeds to step S108 to determine whether or not the reception is restarted. When it is determined that the reception is not restarted, the operated-side controller 3 returns to step S107. Accordingly, during the failsafe gradual change process, any one of the arrival to the failsafe value or the restart of reception is waited.

When it is determined in step S108 that the reception is restarted, the operated-side controller 3 proceeds to step S113 to execute the above-described gradual change return process, and completes the series of processes shown in FIG. 8.

Further, in the gradual change return process, the motor driving instruction value outputted at each processing timing that is gradual changing is obtained based on the information on the difference between the motor driving instruction value outputted immediately before the start of the return process in the case of a gradual change and the received value, the processing cycle, and the set gradual change period.

When it is determined in step S107 that the motor driving instruction value has reached the failsafe value, the operated-side controller 3 proceeds to step S109, and starts the failsafe hold process. In other words, the process of holding the motor driving instruction value at the failsafe value is started.

In step S110 subsequent to step S109, the operated-side controller 3 determines whether or not the reception is restarted. When it is determined that the reception is not restarted, the process proceeds to step S111 to determine whether or not to complete the process. In other words, it is determined whether or not the process completion conditions of the failsafe hold process are satisfied. The process completion conditions of the failsafe hold process may be various. For example, the process completion conditions may include whether or not a predetermined period of time has elapsed from the start of the failsafe hold process. Alternatively, the process completion conditions may include the input of a predetermined signal (e.g., a signal corresponding to user's manipulation) instructing the completion of the failsafe hold process.

When it is determined in step S111 that the process has not been completed, the operated-side controller 3 returns to step S110. Accordingly, during the failsafe hold process, any one of the process completion and the restart of reception is waited.

It is not necessary to stand by any one of the process completion and the restart of reception during the failsafe hold process, and only the restart of reception may be waited.

When it is determined in step S110 that the reception is restarted, the operated-side controller 3 proceeds to step S114 to execute the above-described return process after failsafe, and completes the series of processes shown in FIG. 8.

Further, in the return process after failsafe, the motor driving instruction value outputted at each processing timing that is gradually changing is obtained based on the information on the difference between the failsafe value and the received value, the processing cycle, and the set gradual change period.

When it is determined in step S111 that the process has been completed, the operated-side controller 3 completes the series of processes shown in FIG. 8.

4. MODIFICATION

The embodiment is not limited to the specific example described above, and various configurations as modifications may be adopted.

For example, although the example in which the motor as an operated object is the motor 5 serving as the propulsive power source of the operated object 10 has been described, in the present disclosure, the motor to be controlled is not limited to the motor serving as the propulsive power source of the operated object. For example, in a operated object having an engine serving as a propulsive power source, the motor may be a servo motor for performing throttle control of the engine. Alternatively, the motor may be a servo motor (e.g., an aileron, an elevator, a rudder, a flap) for moving blade in the case where the operated object 10 is a model airplane, or may be a steering servo motor in the case where the operated object 10 is a model vehicle or the like.

The "motor driving instruction value" in the present disclosure is a concept including an instruction value for controlling the output of the motor in the case where the motor as an operated object is a servo motor.

Further, although the case in which the operated object having the reception device of the present disclosure is a flying object has been described, the reception device of the present disclosure may also be applied to the case in which the operated object is an object other than the flying object, such as a model vehicle, various robots, or the like.

5. SUMMARY OF EMBODIMENT

As described above, the reception device (the receiver 1) according to an embodiment, which is the reception device mounted on the operated object 10 that is remotely controlled based on the control signal, include the reception part (the operated-side communication part 2) for receiving the control signal from the transmission device (the transmitter 20), and the controller (the operated-side controller 3) for outputting, as the motor driving instruction value for controlling the driving amount of the motor 5, the motor driving instruction value corresponding to the control signal received by the reception part.

When the control signal cannot be received, the controller performs the hold process for hold-outputting, as the motor driving instruction value, the value corresponding to the control signal during the reception period. Further, when the period of the hold output reaches a certain period, the controller performs the failsafe gradual change process in which the motor driving instruction value is gradually changed from the value in the hold process toward the failsafe value determined for failsafe.

Due to the failsafe gradual change process, it is possible to prevent the motor driving instruction value from being changed suddenly by the activation of the failsafe process after the hold process, and also possible to prevent the posture of the operated object from being changed suddenly or the motor from being damaged by the activation of the failsafe process.

Therefore, it is possible to realize both the safety improvement obtained by performing the failsafe process and the safety improvement obtained by preventing the sudden posture change of the operated object and the damage to the motor due to the activation of the failsafe process.

Further, in the reception device according to an embodiment, the motor serves as a propulsive power source of the operated object.

The motor serving as the propulsive power source of the operated object has a relatively high output. When the motor driving instruction value suddenly changes to the failsafe value due to the failsafe function, the posture of the operated object is more likely to become unstable, and the amount of the counter electromotive force tends to increase, thereby increasing the possibility of damage to the motor.

Hence, it is preferable to perform the failsafe gradual change process according to an embodiment.

Further, in the reception device according to an embodiment, the operated object is a flying object.

The operated object that is a flying object moves in an area without width restriction or with less width restriction, such as a sky, compared to the operated object that is a model vehicle moving on a road with a certain width.

Therefore, there is more time to gradually change the motor driving instruction value toward the failsafe value by the failsafe gradual change process.

Hence, it is preferable to perform the failsafe gradual change process.

Further, in the reception device according to an embodiment, the controller can variably set the gradual change period by the failsafe gradual change process.

Accordingly, the gradual change period can be customized depending on the purpose of the operated object, the characteristics of the motor, or the like.

Hence, it is possible to improve user's usability related to the failsafe gradual process function.

Further, in the reception device according to the embodiment, the controller performs the failsafe hold process of holding the motor driving instruction value at the failsafe value after the motor driving instruction value is changed to the failsafe value by the failsafe gradual change process.

Accordingly, it is possible to stand by the restart of reception in a state where the motor driving instruction value is suppressed at the failsafe value.

Hence, it is possible to avoid the standby of the restart of reception in a state where the propulsive force of the operated object is high, and also possible to improve safety.

Further, in the reception device according to the embodiment, when the reception of the control signal is restarted during the failsafe gradual change process, the controller performs the return process in the case of a gradual change in which the motor driving instruction value is gradually changed toward the receive value that is the motor driving instruction value corresponding to the control signal after the restart of reception (see FIG. 5 or the like) Accordingly, when the motor driving instruction value is returned to the received value by the restart of reception during the failsafe gradual change process, it is possible to avoid a sudden change in the motor driving instruction value from the value during the failsafe gradual change process to the received value.

Hence, it is possible to prevent the posture of the operated object from being disturbed or the motor from being damaged.

Further, in the reception device according to the embodiment, when the reception of the control signal is restarted during the hold process, the controller performs the return process in the case of hold in which the motor driving instruction value is gradually changed toward the received value that is the motor driving instruction value corresponding to the control signal after the restart of reception (see FIG. 6 or the like).

Accordingly, when the motor driving instruction value is returned to the received value by the restart of reception during the hold process, it is possible to avoid a sudden change in the motor driving instruction value from the value during the hold process to the received value.

Hence, it is possible to prevent the posture of the steered object from being disturbed or the motor from being damaged.

Further, in the reception device according to the embodiment, when the reception of the control signal is restarted during the failsafe hold process, the controller performs the return process after failsafe in which the motor driving instruction value is gradually changed toward the received value that is the motor driving instruction value corresponding to the control signal after the restart of reception (see FIG. 7 or the like).

Accordingly, when the motor driving instruction value is returned to the received value by the restart of reception during the failsafe hold process, it is possible to avoid a sudden change in the motor driving instruction value from the value during the failsafe hold process to the received value.

Hence, it is possible to prevent the posture of the steered object from being disturbed or the motor from being damaged.

Further, in the reception device according to the embodiment, the controller performs the setting of activation/deactivation of the failsafe gradual change process, the setting of the failsafe gradual change period that is the gradual change period of the motor driving instruction value, and the setting of the failsafe value based on the instruction executed by the external device based on user's manipulation.

Accordingly, the user can instruct the reception device to set the activation/deactivation of the failsafe gradual change process, the gradual change period of the failsafe gradual change, and the failsafe value by manipulation.

Further, in the reception device according to an embodiment, the external device is the transmission device (the transmitter 20).

Accordingly, the user can instruct the reception device to set the activation/deactivation of the failsafe gradual change process, the gradual change period of the failsafe gradual change, and the failsafe value using the transmission device.

Further, in the reception device according to an embodiment, the external device is a separate external device different from the transmission device.

Accordingly, the user can instruct the reception device to set the activation/deactivation of the failsafe gradual change process, the gradual change period of the failsafe gradual change, and the failsafe value using an external device different from the transmission device.

Further, in the reception device according to an embodiment, when the reception of the control signal is restarted after the start of the hold process, the controller performs the gradual change process in the case of a gradual change in which the motor driving instruction value is gradually changed toward to the received value that is the motor driving instruction value corresponding to the control signal after the restart of reception, and individually sets the gradual change period in the case of restart of reception, which is the gradual change period of the motor driving instruction value by the gradual change process in the case or restart of reception, and the gradual change of the failsafe gradual change based on the instruction from the external device.

Accordingly, when the reception device can perform the gradual change process in the case restart of reception, the user can individually instruct the reception device to set the gradual change period of the failsafe gradual change and the gradual change period in the case restart of reception.

The invention claimed is:

1. A reception device mounted on an operated object that is remotely controlled based on a control signal, comprising:
   a reception part configured to receive the control signal from a transmission device; and a controller configured to performs a process of outputting a motor driving instruction value corresponding to the control signal received by the reception part as a motor driving instruction value for controlling a driving amount of a motor,
   wherein the controller performs:
   a hold process for holding and outputting a value corresponding to the control signal during a reception period as the motor driving instruction value when the control signal is not receivable; and a failsafe gradual change process for gradually changing the motor driving instruction value from the value during the hold process toward a failsafe value determined for failsafe when a period of the hold process reaches a certain period,
   wherein the controller is configured to variably set a gradual change period by the failsafe gradual change process.

2. The reception device of claim 1, wherein the motor is provided as a propulsive power source of the operated object.

3. The reception device of claim 1, wherein the operated object is a flying object.

4. The reception device of claim 1, wherein the controller performs a failsafe hold process of holding the motor driving instruction value at the failsafe value after the motor driving instruction value is changed to the failsafe value by the failsafe gradual change process.

5. The reception device of claim 1, wherein when the reception of the control signal is restarted during the failsafe gradual change process, the controller performs a return process in the case of a gradual change in which the motor driving instruction value is gradually changed toward a received value that is the motor driving instruction value corresponding to the control signal after the restart of the reception.

6. The reception device of claim 2, wherein when the reception of the control signal is restarted during the failsafe gradual change process, the controller performs a return process in the case of a gradual change in which the motor driving instruction value is gradually changed toward a received value that is the motor driving instruction value corresponding to the control signal after the restart of the reception.

7. The reception device of claim 3, wherein when the reception of the control signal is restarted during the failsafe gradual change process, the controller performs a return process in the case of a gradual change in which the motor driving instruction value is gradually changed toward a received value that is the motor driving instruction value corresponding to the control signal after the restart of the reception.

8. The reception device of claim 1, wherein when the reception of the control signal is restarted during the hold process, the controller performs a return process in the case of hold in which the motor driving instruction value is gradually changed toward a received value that is the motor driving instruction value corresponding to the control signal after the restart of the reception.

9. The reception device of claim 2, wherein when the reception of the control signal is restarted during the hold process, the controller performs a return process in the case of hold in which the motor driving instruction value is gradually changed toward a received value that is the motor driving instruction value corresponding to the control signal after the restart of the reception.

10. The reception device of claim 3, wherein when the reception of the control signal is restarted during the hold process, the controller performs a return process in the case of hold in which the motor driving instruction value is gradually changed toward a received value that is the motor driving instruction value corresponding to the control signal after the restart of the reception.

11. The reception device of claim 4, wherein when the reception of the control signal is restarted during the failsafe hold process, the controller performs a return process after failsafe in which the motor driving instruction value is gradually changed toward a received value that is the motor driving instruction value corresponding to the control signal after the restart of the reception.

12. The reception device of claim 1, wherein the controller performs setting of activation and/or deactivation of the failsafe gradual change process, setting of the gradual change period of a failsafe gradual change that is the gradual change period of the motor driving instruction value by the failsafe gradual change process, and setting of the failsafe value depend on an instruction executed by an external device based on user's manipulation.

13. The reception device of claim 12, wherein the external device is the transmission device.

14. The reception device of claim 12, wherein the external device is an external device different from the transmission device.

15. The reception device of claim 12, wherein the controller performs, when the reception of the control signal is restarted after the start of the hold process, a gradual change process in the case of the restart of the reception in which the motor driving instruction value is gradually changed toward a received value that is the motor driving instruction value corresponding to the control signal after the restart of the reception, and individually sets the gradual change period in the case of restart of reception that is the gradual change period of the motor driving instruction value by the gradual change process in the case of restart of reception, and the gradual change period of the failsafe gradual change based on an instructions from the external device.

* * * * *